United States Patent

Oettinger

[11] 3,993,227
[45] Nov. 23, 1976

[54] ROTARY FEEDER VALVE

[75] Inventor: John F. Oettinger, Portland, Oreg.

[73] Assignee: Esco Corporation, Portland, Oreg.

[22] Filed: Sept. 8, 1975

[21] Appl. No.: 611,187

[52] U.S. Cl. .............................. 222/368; 403/356
[51] Int. Cl.² ..................... G01F 11/10; F16B 3/00
[58] Field of Search ........... 222/368; 403/154, 155, 403/356, 358, 362

[56] References Cited
UNITED STATES PATENTS

| 1,326,871 | 12/1919 | Junggren | 403/356 |
| 2,143,005 | 1/1939 | Green | 403/362 |
| 2,293,882 | 8/1942 | Bachelder | 403/362 |
| 2,858,212 | 10/1958 | Durant et al. | 222/368 |

*Primary Examiner*—Allen N. Knowles
*Assistant Examiner*—Hadd Lane
*Attorney, Agent, or Firm*—Tilton, Fallon, Lungmus, Chestnut & Hill

[57] ABSTRACT

A rotary feeder valve adapted to feed wood chips into a digester wherein a rotor assembly which includes a pocket-body interference fitted to a shaft is further uniquely pinned thereto to stabilize the body and shaft under unforeseen and abnormal operating conditions.

4 Claims, 4 Drawing Figures

ROTARY FEEDER VALVE

BACKGROUND AND SUMMARY OF THE INVENTION

This invention relates to a rotary feeder valve and more particularly, a rotary feeder valve especially adapted for transferring particulate material such as wood chips from a source to a pressure vessel such as a digester.

In a rotary feeder which transfers particulate material from one environment to another, the shaft supporting the rotor proper may be subject to severe bending stresses. If one environment is at a higher pressure than the other, the force resulting from the imbalance in pressure acting against the area of the rotor is constantly exerted on the rotor as it turns to convey the material in each pocket from the inlet position to the outlet position. This force acting against the rotor tends to bend the rotor shaft from the area of higher pressure.

In a very large rotary feeder used in pulp mills, the force resulting from the imbalance in pressures can reach 175,000 pounds.

Since the position of the higher pressure, and therefore the resulting force, is constant in relation to the rotary feeder, and the rotor and shaft are turning, the force tending to bend the shaft is producing constantly reversing stresses in the shaft. As the rotor and shaft turn 360°, a particular portion of the shaft is subjected to a tensile stress, then compressive stress, then tensile stress, etc. Such a condition can result in premature fatigue failure of the shaft.

Fatigue failure normally starts as a microscopic crack, which propagates across the area of the shaft. The crack is initiated by a local condition which causes the local reversing stresses to exceed the capabilities of the material of which the shaft is made. Such a local condition, often called a "notch", can be a metallurgical defect in the material, a metallurgical condition arising from manufacturing processes such as welding, or a sharp corner machined into the shaft. Good design practice for rotating shafts subject to bending calls for the best possible material plus the use of polished surfaces and large radii to avoid creating such a notch.

However, in the construction of rotary feeder, it is not uncommon to assemble the rotor to the shaft by welding or other means which unavoidably have the effect of producing a "notch". Such a condition may cause a shaft to fail by fatigue. The instant invention provides the assembly of a rotor and shaft which minimizes the possibility of fatigue failure by substantial elimination of "notch" conditions. To this end, I provide in a rotor assembly, a rotor body which is equipped with peripherially facing pockets and an axial bore. Interference fitted within the bore is a shaft and the rotor and shaft are equipped with aligned openings in which a pin is mounted.

DETAILED DESCRIPTION OF THE INVENTION

The invention is described in conjunction with an illustrated embodiment of the invention as follows.

Figure 1:
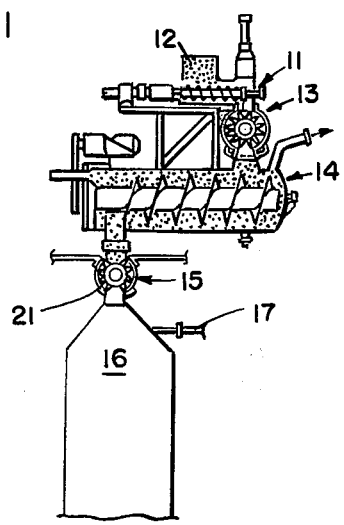
FIG. 1 is a fragmentary elevational view, partially in section and partially schematic showing the environment in which the inventive valve is employed.

In the illustration given, and with particular reference to FIG. 1, a vertical digester that deals with wood chips and pulp is shown (the piping details being substantially omitted). The numeral 10 designates generally the digester proper which is seen to be a vertically elongated chamber arranged to receive wood chips at the top and discharge digested pulp at the bottom.

To introduce the chips at the top, a metering screw mechanism 11 is employed which is equipped with an inlet as at 12 communicating with a wood chip source (not shown). The chips from the metering screw mechanism 11 are discharged into a low pressure rotary feeder valve generally designated 13 and this, in turn, transfers the chips into a lower pressure pre-steamer, generally designated 14. From the pre-steamer 14, the chips move into the inventive high pressure rotary feeder valve, generally designated 15.

The bottom outlet of the feeder valve mechanism 15 is coupled to the top portion of the digester 10 wherein the chips are subjected to steaming in a zone designated 16. The steam for pre-steaming is advantageously introduced through the high pressure feeder valve 15 where it is employed to purge chips from the pockets whereby the same stem performs a dual function. If required, high pressure steam may be introduced by the line 17. Thus, the inventive rotary feeder valve 15 has a high pressure on its outlet side (via communication with the digester 10) and a realtively lower pressure at its inlet (coupled to the lower pressure pre-steamer 14).

Figure 2:
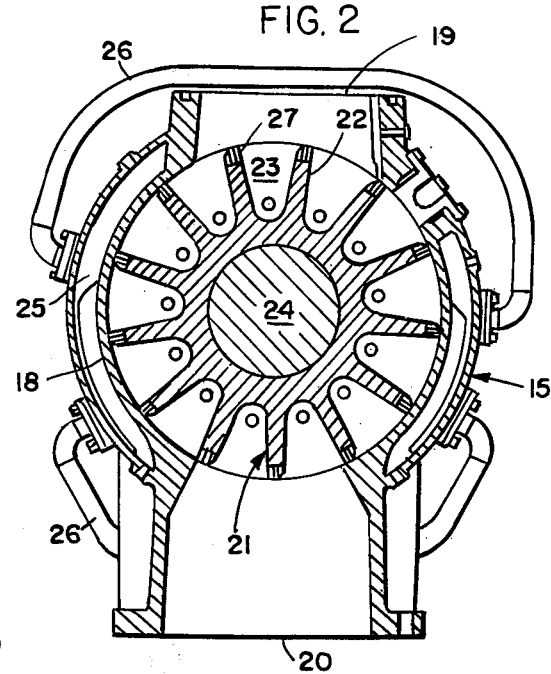
FIG. 2 is a sectional view of the inventive valve.

As can be appreciated from FIG. 2, the rotary feeder valve 15 includes a casing 18 which provides an inlet as at 19 and an outlet as at 20. Rotatably mounted within the casing 19 is a rotor assembly generally designated 21 which includes a rotor body 22 having peripherally facing pockets as at 23 and a supporting shaft 24.

Advantageously, the casing may be equipped with jackets as at 25 and cross-over pipes as at 26 although these constitute no part of the instant invention. Still further, the details of the pocket-forming walls, and particularly the ends thereof as at 27 also may be varied in accordance with the teachings in this art.

Figure 3:
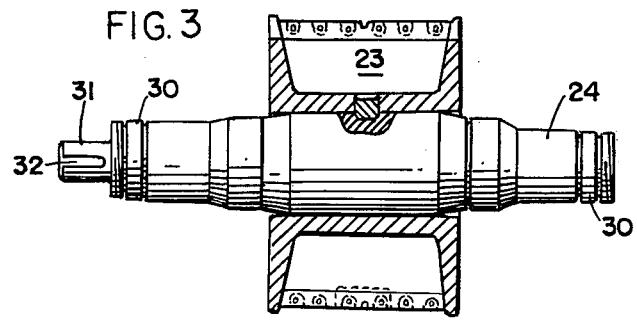
FIG. 3 is an elevational view, partially in section of the rotor assembly portion of FIG. 2.
Figure 4:
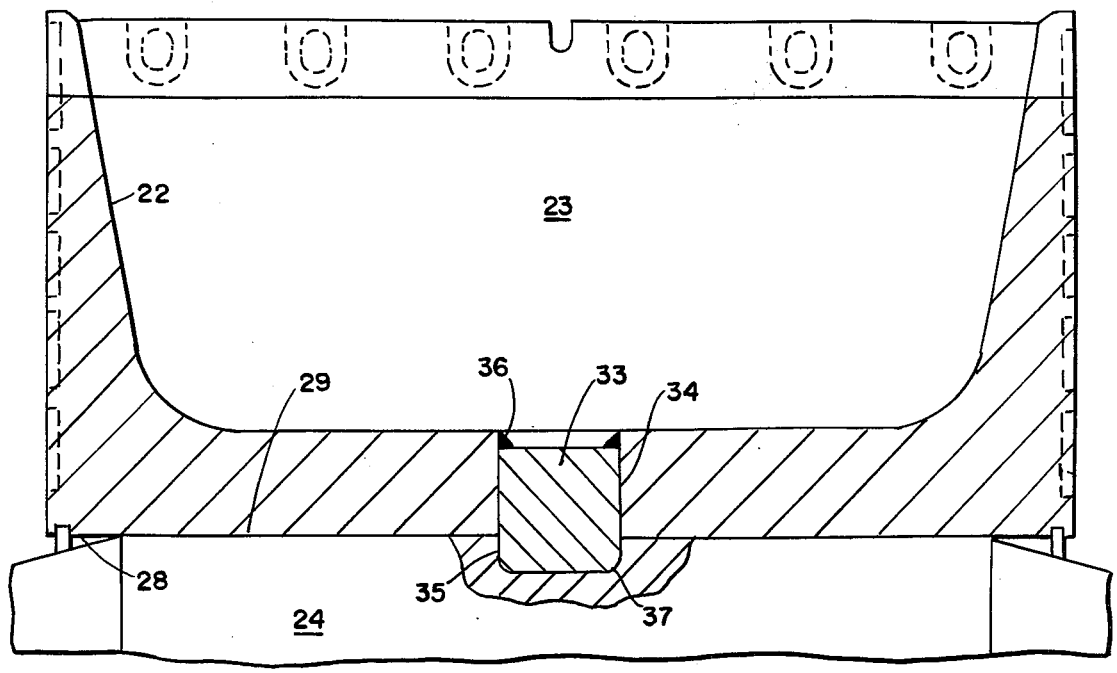
FIG. 4 is an enlarged fragmentary view of the central portion of FIG. 3.

As can be best appreciated from a consideration of FIGS. 3 and 4, the rotor body 22 is equipped with an axial bore as at 28. Mounted within the bore 28, as by an interference or press fit 29 is the supporting shaft 24. The shaft 24 is equipped with journals as at 30 to be received within support bearings (not shown) and a shaft extension 31 equipped with a keyway 32 for connection to a drive (also not shown).

As mentioned previously, the shaft 24 is inserted into the rotor body 22 in such a manner that an interference fit (which may be as much as 0.015 inches) results at the shaft/rotor interface 29. This interference fit 29 is sufficient to prevent any relative motion between the shaft 24 and rotor 22 under normal operating conditions.

To prevent relative motion between the shaft 24 and rotor 22 under unforeseen and abnormal operating conditions, a pin 33 is inserted across the shaft/rotor interface from the bottom of one or more pockets 23 in the rotor body 22. For this purpose, the rotor body 22 in the pocket bottom is equipped with an opening 34 and, in similar fashion, so is the shaft 24 as at 35. Hence the pin 33 is mounted in the aligned openings 34 and 35 and maintained in position by means of a weldment 36 around the exposed end of the pin 33.

As a specific illustration of the invention for use in the pulp industry, the rotor body 22 may have a diameter of approximately 43 inches and having a bore 28 of the order of 15 ½ inches. Fitted within the bore 28 is a shaft which may have a length of the order of 75 inches. In such an installation, I have found it advantageous to employ a pin 33 which has a diameter of about 3-¼ inches and a length of about 3-¼ inches with about one third of the pin length being received in the opening 35 in the shaft 24 and the remainder being received within the opening 34 in the base of a rotor pocket 23. To further minimize the development of notches, the radii at the bottom of the pin and the base of the opening 35 as in the position designated 37 are of the order of one half inch. Through the location of the pin and the side of the diameter of the pin and the radii 37, it is possible to substantially eliminate the notch effect on the shaft 34.

While in the foregoing specification, a detailed description of an embodiment of the invention has been set down for the purpose of illustration, many variations of the details hereingiven may be made by those skilled in the art without departing from the spirit and scope of the invention.

I claim:

1. In a rotary feeder valve for introducing particulate material into a pressurized vessel, a casing having a top inlet arranged to be coupled to a source of said material and a bottom outlet arranged for connection to said vessel, and a pocket-equipped rotor assembly in said casing and mounted for rotation to serially move said pockets from said inlet to said outlet, the improvement wherein said rotor assembly comprises a generally cylindrical body having a plurality of radially extending pockets open at the periphery of said body and an axially extending bore, a shaft mounted in said bore and having an interference fit therewith, at least one set of openings, one in each of said shaft and in the central bottom of one of said body pockets, said openings being substantially cylindrical and having their axes aligned in a radial direction relative to said cylindrical body, and a generally cylindrical pin mounted in said aligned openings and coaxial therewith, said pin having an interference fit with both of said openings and extending across the interface between said shaft and body and constituting the main connection between said shaft and body for torque transmission therebetween.

2. The structure of claim 1 in which a plurality of substantially cylindrical openings are provided in said body, one in each body pocket central bottom, a plurality of substantially cylindrical openings in said shaft, one for each body opening and coaxial therewith, and a generally cylindrical pin mounted in each pair of coaxially related openings and with the pin axis coaxial with the axes of said openings.

3. The structure of claim 1 in which said pin has the major portion of its length mounted in said body opening, and a weldment connecting said pin with the wall providing said body opening.

4. The structure of claim 1 in which said pin is equipped with a rounded shoulder at the end received within said shaft opening, said shaft opening being equipped with a conforming contour thereto.

* * * * *